United States Patent [19]
Hughes

[11] Patent Number: 5,766,020
[45] Date of Patent: Jun. 16, 1998

[54] POWER ADAPTER INTERFACE APPARATUS

[76] Inventor: Michael Hughes, 5865 The Twelfth Fairway, Suwanee, Ga. 30174

[21] Appl. No.: 600,134

[22] Filed: Feb. 12, 1996

[51] Int. Cl.[6] .................................................. H01R 23/02
[52] U.S. Cl. ............................................. 439/35; 439/653
[58] Field of Search ................................ 439/35, 34, 653, 439/668, 675, 650

[56] References Cited

U.S. PATENT DOCUMENTS

| | | |
|---|---|---|
| D. 335,122 | 4/1993 | Hughes . |
| 4,248,494 | 2/1981 | McDonalds . |
| 4,261,634 | 4/1981 | Robinsons . |
| 4,270,115 | 5/1981 | Bonnetts . |
| 4,405,190 | 9/1983 | Schroeders . |
| 4,726,786 | 2/1988 | Hills . |
| 4,781,393 | 11/1988 | Jeters . |
| 4,846,697 | 7/1989 | Rodgers . |
| 4,936,796 | 6/1990 | Anderson, Jr. . |
| 5,127,844 | 7/1992 | Lemans . |
| 5,281,147 | 1/1994 | Hughes . |
| 5,354,204 | 10/1994 | Hughes . |
| 5,443,389 | 8/1995 | Hughes . |
| 5,514,009 | 5/1996 | Hughes . |
| 5,626,479 | 5/1997 | Hughes . |

*Primary Examiner*—Gary F. Paumen

[57] ABSTRACT

A plurality of power adapter embodiments which electrically couple an electrical system of a first vehicle with the power supply of second vehicle or an electrical or household appliance such as a VCR or vacuum cleaner. The power adapter, at first end, being mateable with a plurality of trailer wiring harness connector receptacles found at the rear of the first vehicle, at second end, being mateable with a cigarette lighter plug and a 100 volt AC style connector plug, while also having a third and fourth end connectable with battery cable clamps extending from an automotive jumper cable. The power adapter includes insulation displaced electrical conductors, wires, or a printed circuit board within the housing equipped with a fused 13.8 or 12 volt DC to 120 volt AC voltage converter circuit, and a visual diagnostic indicator such as an LED, visible at the housing, to confirm proper operation to the user.

5 Claims, 6 Drawing Sheets

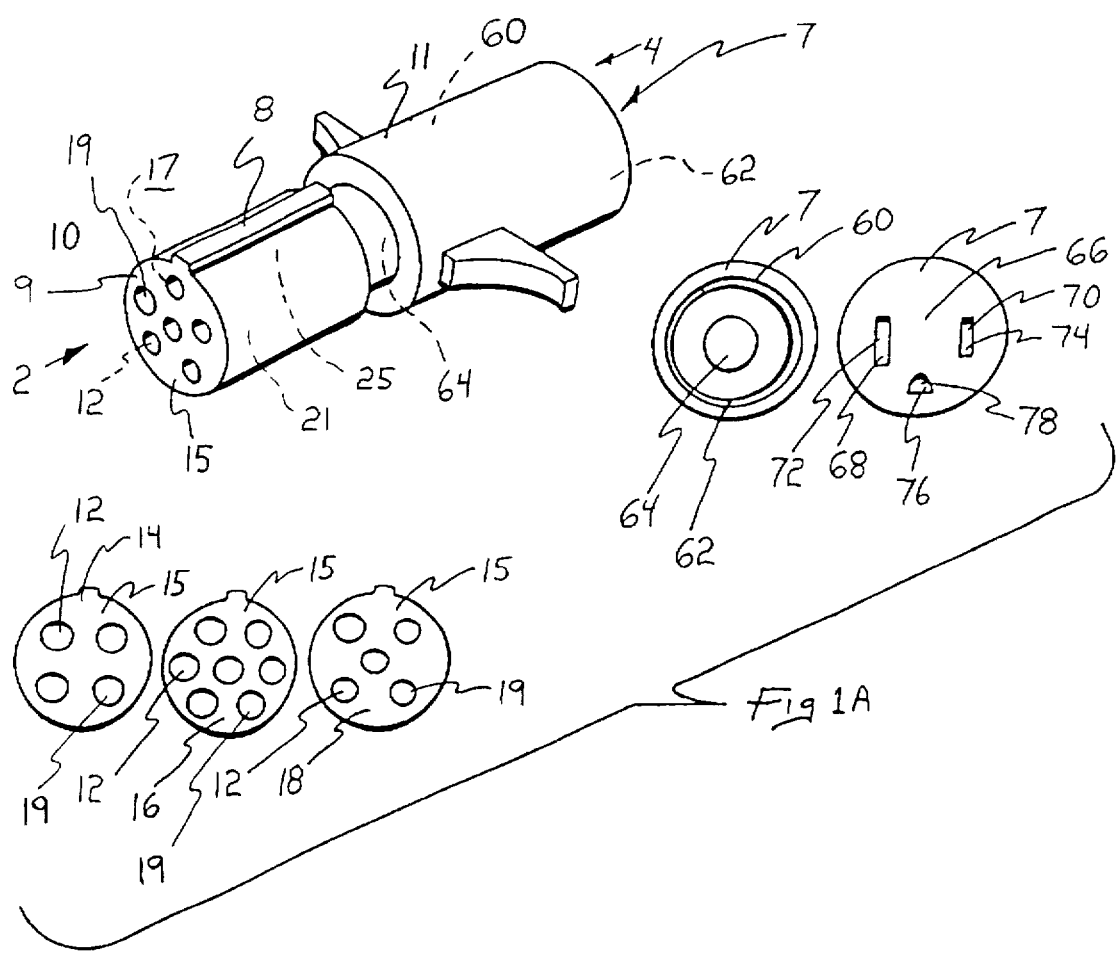

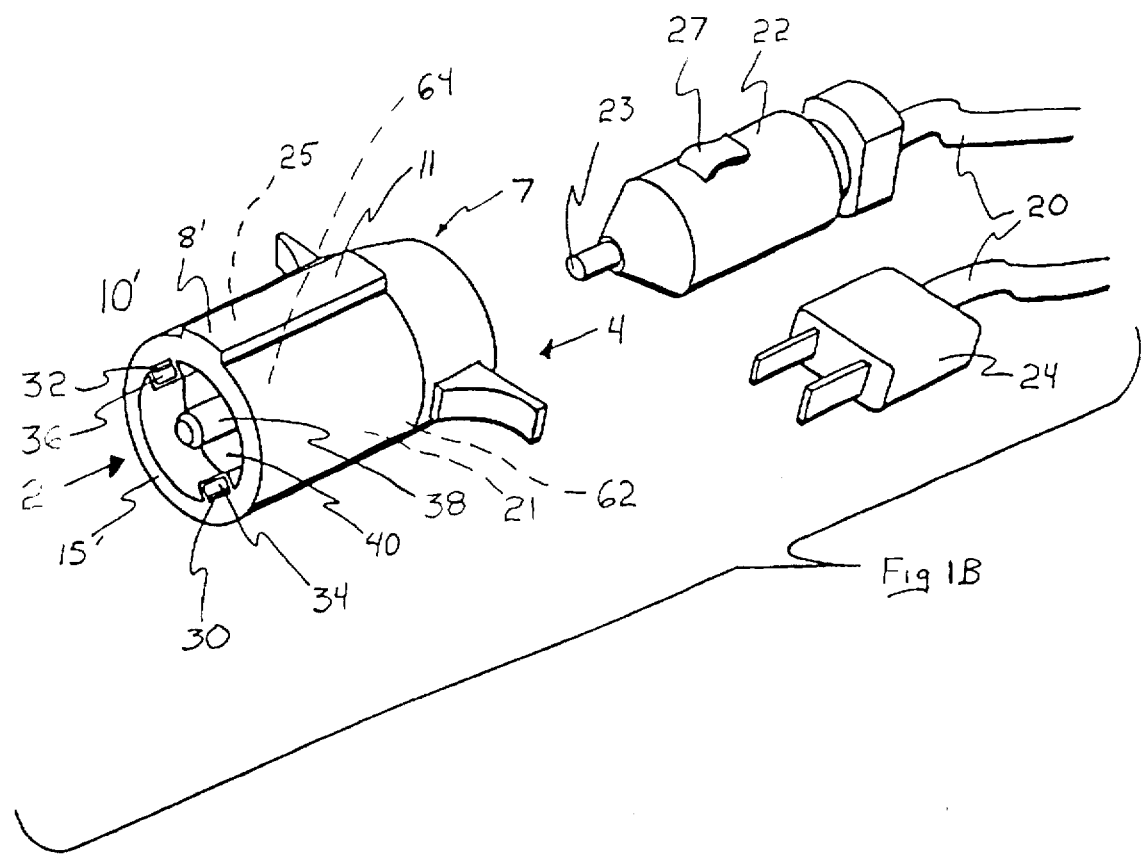

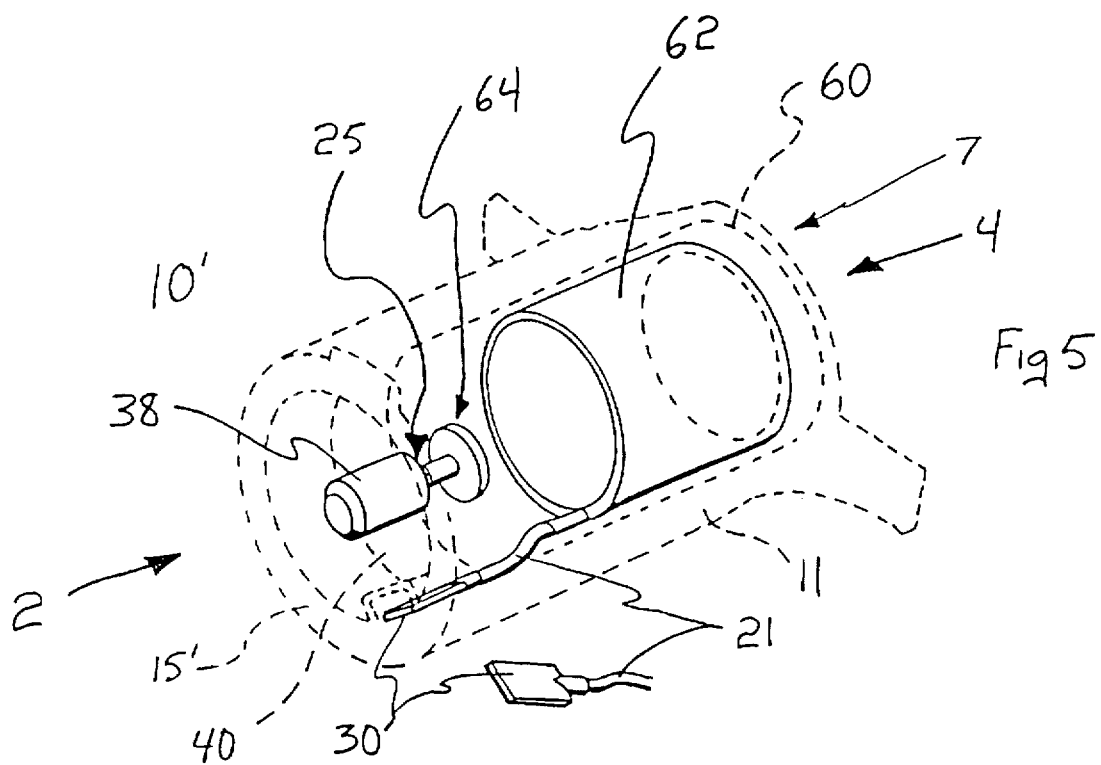
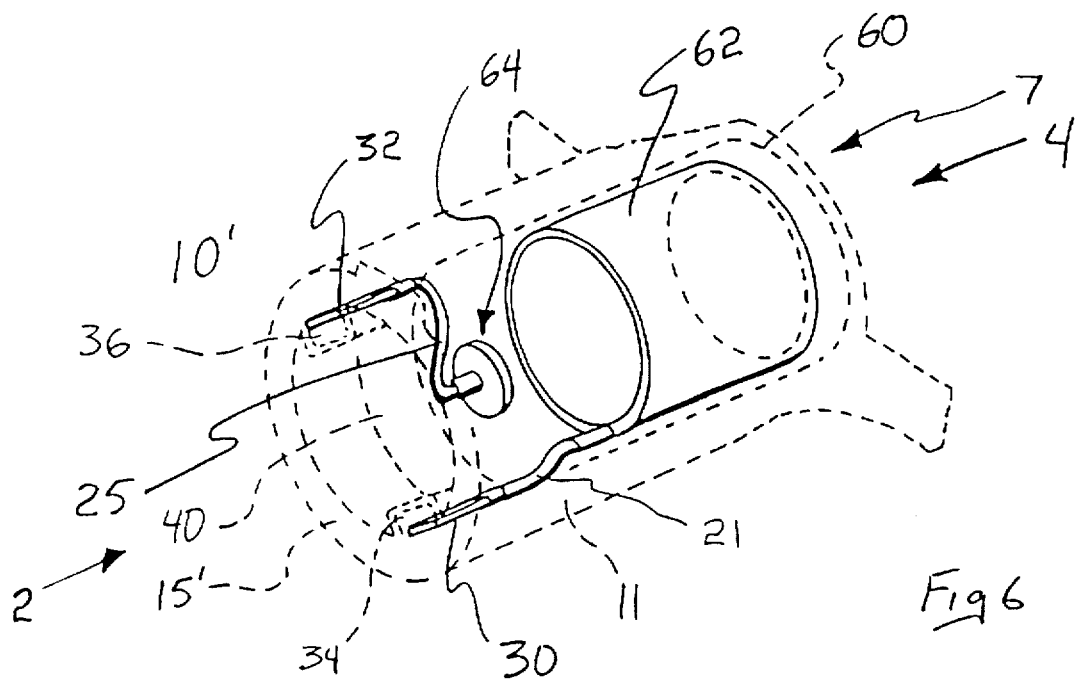

POWER ADAPTER INTERFACE APPARATUS

FIELD OF INVENTION

The present invention generally relates to a wiring interface for electrically coupling an electrical system of a first vehicle with the power supply of a second vehicle or an electronic or household appliance. More particularly the present invention relates to a power supply adapter providing power for said second vehicle or appliance via the towing vehicle trailer wiring harness receptacle located at the rear of many motor vehicles.

BACKGROUND OF THE INVENTION

In recent years, many electronic and household appliances such as vacuum cleaners, stereos, telephones, and even televisions have become more and more compact and portable. Many of these appliances are now equipped with dual voltage power supply capability. For instance, it is common now to purchase a VCR which not only is connectable to a 110 volt AC style receptacle but may also be equipped with a 12 volt supply connector. Such a connector is most commonly called a cigarette lighter plug.

Cigarette lighters, standard in most motor vehicles, when removed, provides a 12 volt power supply receptacle able to receive a cigarette lighter plug extending from many electronic and household appliances.

Problems occur when the desired appliance, such as an electric ice and beverage cooler, is too bulky to keep within the small cab of a pick-up truck in addition to transporting additional passengers.

Another problem occurs when one wishes to fill a flattened tire on a trailer using a common 12 volt portable air compressor. The cord is usually too short to reach beyond the end of the vehicle to the trailer wheels.

In addition to the need to power appliances, other extended power supplies from the vehicle is often needed such as when a second motor vehicle needs a jump start.

Most often, when jump starting a second vehicle, the first vehicle must park parallel or "front end to front end" with the second vehicle so a jumper cable can reach both batteries. This can be very dangerous because the first vehicle is required to drive against the flow of traffic or park within the flow of traffic to get positioned with the second vehicle. It would then be much simpler to jump start a second vehicle from the rear of a first vehicle.

To date, the only exterior electrical interface with the first vehicle batter, electrical systems, or power supply, is what is called a trailer harness connected receptacle located in proximity to the trailer hitch and ball at the rear of the first vehicle. These vehicles, fitted with various configurations of plugs or receptacles, routinely tow other vehicles or trailers. The harness plug or receptacle at the rear, when electrically engaged with the appropriate trailer and plug, allows synchronization of the brakes, lights, and other electrical systems on the towed trailer with the towing vehicles corresponding electrical systems.

The most common receptacles are round with a plurality of electrical terminals utilizing a plurality of terminal polygonal placement patterns within the receptacle hidden under a protective lid. These terminals, either round males and/or females, or blade type males, each provide power for each appropriate trailer electrical circuit. The most common styles include four, five, six, seven or nine-way round "Blade" or "Pin Style" receptacles.

Another common style of connector plug is a three or four-way flat, harness plug. This is among the most commonly used style plugs for use with the most common tailers providing a grounded male pin terminal with three barrel shaped female receptacles.

Unfortunately not trailer wiring harness receptacle is able to electrically couple with a cigarette lighter plug, a 110 volt AC style power plug, or the clamps extending from a battery jumper cable.

Many prior art adapter embodiments exist such as:
Hughes U.S. Pat. No. 5,354,204 Dated Oct. 11, 1994
Hills U.S. Pat. No. 4,726,786 Dated Feb. 23, 1988
Hughes U.S. Pat. No. 5,281,147 Dated Jan. 25, 1994
Rodgers U.S. Pat. No. 5,846,697 Dated Jul. 11, 1989
Schroeders U.S. Pat. No. 4,405,190 Sep. 20, 1983
Hughes U.S. Pat. No. Design 335,122 Apr. 27, 1993
Le'mans U.S. Pat. No. 5,127,844 Jul. 7, 1992
Anderson Jr's U.S. Pat. No. 4,936,796 Jun. 26, 1990
Jeters U.S. Pat. No. 4,781,393 Nov. 1, 1988
Bonnetts U.S. Pat. No. 4,270,115 May 26, 1981
Robinsons U.S. Pat. No. 4,261,634 Apr. 14, 1981
McDonalds U.S. Pat. No. 4,248,494 Feb. 3, 1981

Accordingly, a heretofore unaddressed need exists in the industry for a means and method of safely and more efficiently gaining a power source access from a first vehicle for a second vehicle or an external electronic or household appliance.

SUMMARY OF THE INVENTION

Briefly described, the present invention comprises a method and apparatus for interfacing the electrical system of a first vehicle with the power supply of a second vehicle or with an electronic or household appliance. To provide this interfacing, the unitary power adapter apparatus utilizes a novel method to provide power for various appliances by providing interface with various styles of trailer wiring harness connector receptacles found at the rear of many vehicles.

An object of the current invention is to comprise a plurality of variety of housing embodiments allowing physical and electrical compatibility with all styles of trailer harness receptacles and plugs utilizing a plurality of polygonal placement patterns of electrical terminals.

Another object of the invention is after first end of the power adapter interface is enjoined together with the appropriate trailer harness, the second end of the adapter provides a connector receptacle portion able to mate with a standard 110 volt AC style wall outlet plug and/or provides an appropriate round receptacle able to receive a standard cigarette lighter plug therein.

Another object of the current invention is that it may also comprise a voltage inverter or converter circuit within the housing enabling the current invention to convert the 13.8 or 12 volts supplied from the first vehicle to 110 volt AC supply for the desired appliance.

Another object of the current invention is to provide a visual indicator, such as an illuminating LED or light bulb, to confirm proper power available to the user when correctly coupled with the vehicles electrical system. Accordingly, another object of the novel power adapter apparatus is to also contain a mechanical or solid state circuit breaker to protect the electrical system of the vehicle when the adapter is in use.

Another object of the power adapter apparatus may also provide is a plurality of receptacles at second end, such as two or more cigarette lighter sockets, two or more 110 volt AC style outlet portions or one or more of each.

An additional object of the power adapter interface apparatus is that is may also provide a flexible cord containing a plurality of insulation displaced electrical conductors extending between the first end and second end of the adapter to extend the usable distance between the vehicle and the desired appliance.

Another object of the current invention is that it may also have a third and fourth end preferably extending away from the adapter housing and away from each other, each preferably placed between first and second end. Said third and fourth ends form two polygonal or substantially round male third and fourth electrical connector terminal posts. Each said male connector provides electrical power and gripping surfaces for the common battery jumper cable clamp connectors.

Another object of the novel power adapter apparatus is that is allows the user to safely jump start a second vehicle from the rear of a first vehicle while providing at least one protective cap extending from the adapter housing for protection of said terminal posts while not in use.

Other objects, features, and advantages of the present invention will become apparent from the following detailed description when accompanied with the drawings in which like characters of reference designate corresponding parts throughout the several views. Said additional objects, features, and advantages are intended to fall within the overall scope of the current invention as described in the claims below.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the current invention.

FIG. 1A is a perspective view of a first embodiment of an adapter also illustrating a plurality of terminal placement patterns at first end and plurality of connector configurational patterns at second end in accordance with the present invention for adapting a "Pin Style" four, five, seven, or six-way round trailer harness connector to a cigarette lighter plug or 110 volt AC style plug.

FIG. 1B is a perspective view of a second embodiment of the current invention for adapting a seven or nine-way round "Blade Style" trailer wiring harness connector to a cigarette lighter plug or 110 volt AC style plug.

FIG. 5 is a perspective view of the interior of a second embodiment of the current invention illustrating a barrel shaped male electrical terminal and a blade or spade style electrical terminal at first end electrically connected via wires to a round barrel shaped female electrical contact receptacle and an electrical connector terminal positioned substantially center to said receptacle.

FIG. 6 is a perspective view of the interior of a second embodiment of the current invention illustrating two blade or spade style electrical terminals at first end electrically connected via wires to a round barrel shaped female electrical contact receptacle and an electrical connector terminal positioned substantially center to said receptacle.

DETAILED DESCRIPTION OF THE PREFERRED EMBODIMENT

Figure 1C:
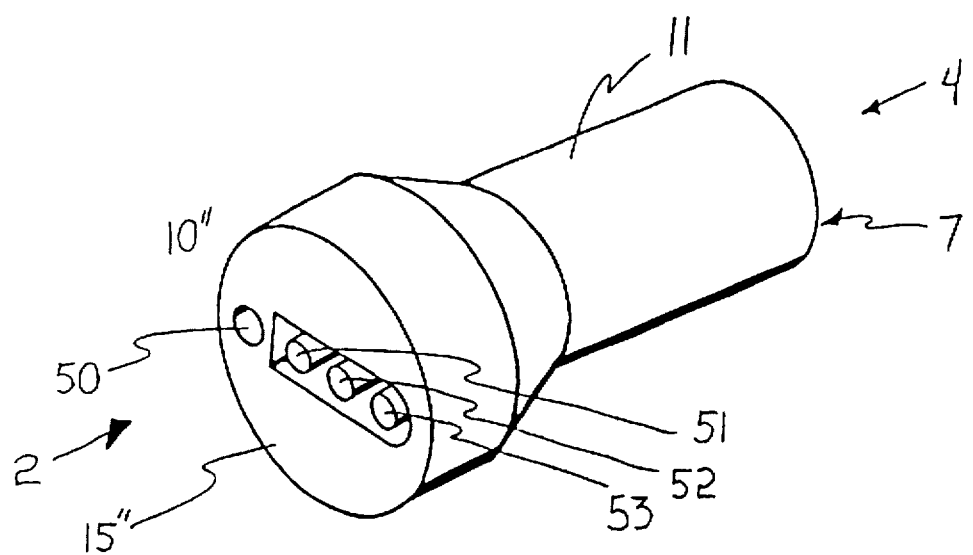
FIG. 1C is a perspective view of a third embodiment of the current invention for adapting a four-way flat style trailer connector to a cigarette lighter plug or 110 volt AC style plug.

Referring now to the drawing in which like numerals indicate corresponding parts throughout the several views, FIGS. 1A, 1B, 1C and 2, illustrate respectively first, second, third, and fourth embodiments of a novel adapter for interfacing an electrical system of a first vehicle (not shown) with a power supply of a second vehicle, (not shown), or a cigarette lighter plug 22, or a 100 volt AC style plug 24, extending from an electronic or household appliance. The first vehicle has a complex harness connector having a number and variety of harness terminal placement patterns, whereas the cord extending from said appliance 20 is terminated with a cigarette lighter plug 22 or a 110 volt AC style plug 24. Each adapter 10, 10', 10", 10'" of receptive FIGS. 1A, 1B, 1C, and 2 is a durable unitary housing formed from resin, plastic, rubber, or other dielectric or suitable material for the purposes described herein. Moreover, a series of at least two insulation displaced electrical conductors, or wires, and/or at least one printed circuit board extend within and through said housing of the various adapter 10, 10', 10", 10'", for transmission of electrical power between the first vehicle and the appliance. In addition, said printed circuit board or PCB, may also include additional electrical circuitry such as a power or voltage converter which converters the 13.8 or 12 volt DC power supply input supplied from the first vehicle to 110 volt AC power output supply for the desired appliance.

Figure 3:
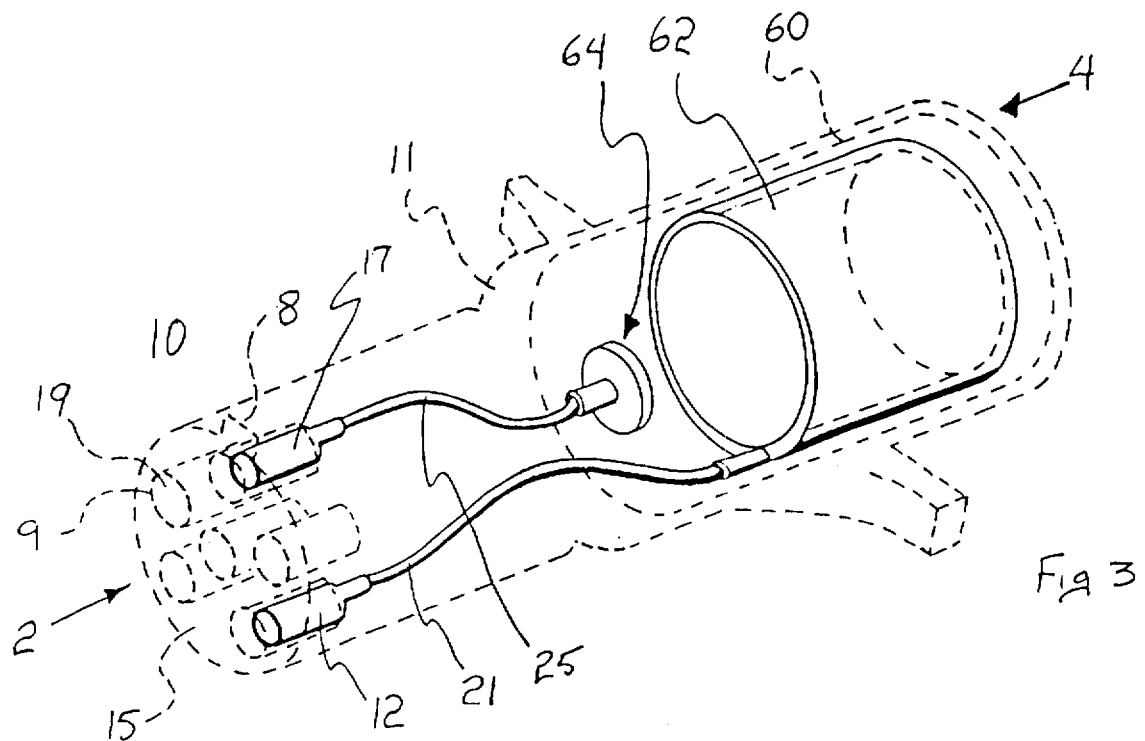
FIG. 3 is a perspective view of the interior of a first embodiment of an adapter illustrating at least two barrel shaped electrical terminals at first end electrically connected via wires to a round barrel shaped female electrical contact receptacle and an electrical connector terminal positioned substantially center to said receptacle.
Figure 4:
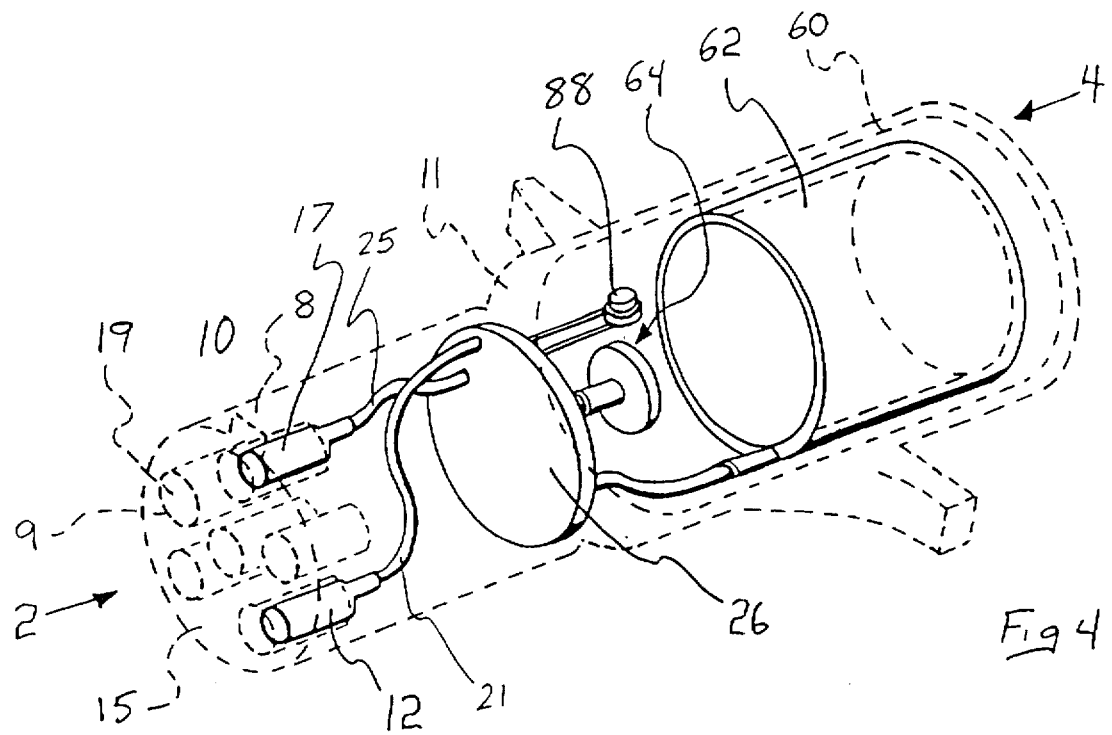
FIG. 4 is a perspective view of the interior of a first embodiment of an adapter illustrating at least two barrel shaped electrical terminals at first end electrically connected via printed circuit board to a round barrel shaped female electrical contact receptacle and an electrical connector terminal positioned substantially center to said receptacle and a visual diagnostic indicator such as an LED.

As shown in FIGS. 1A, 3 & 4 the adapter 10 includes an adapter body housing 11 having first end 2 and second end 4 with said first end having a keyed and substantially cylindrical terminal housing plug portion 8 sized and adapted to engage with a first trailer harness connector receptacle (not shown) of the first motor vehicle.

Figure 2:
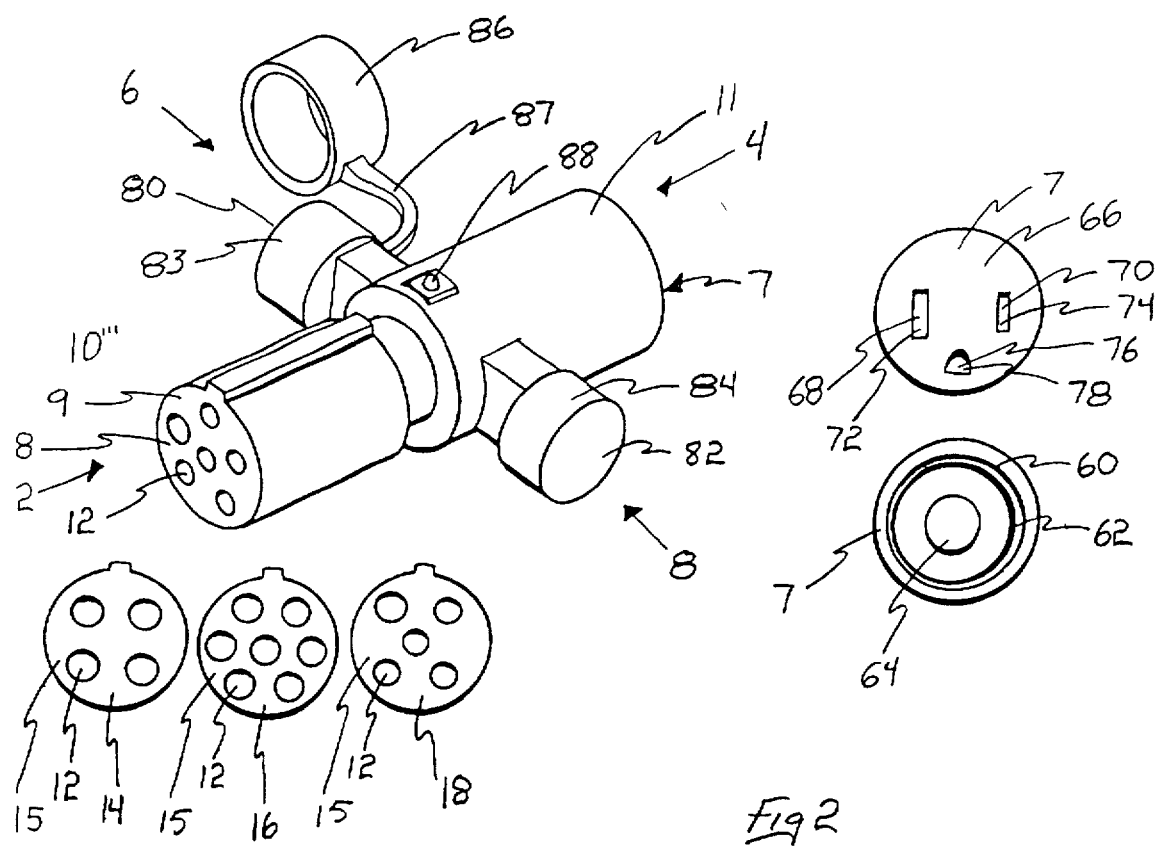
FIG. 2 is a perspective view of a fourth embodiment of the current invention also adaptable to a plurality of round trailer wiring harness connector receptacles having a plurality of terminal placement patterns, to make two male terminal connector posts for connection with connector clamps extending from a battery jumper cable, and a 110 volt AC style plug receptacle or a cigarette lighter plug receptacle.

As illustrated in FIGS. 1A and 2, a plurality of barrel shaped female electrical terminals 12 and 17 are spaced and formed within at least two apertures 19 placed within a substantially polygon pattern 9 which matches the first harness connector pattern thus providing electrical transmission or continuity with a particularly pin style trailer wiring harness receptacle. Said apertures are spaced along the substantially flat frontal termianl housing portion 15 at first end 2.

2. Varied placements of female terminals 12 and 17 within pluralities of polygonal aperture placement patterns 14, 16, and 18 on the terminal housing frontal portion 15, 15', and 15" may also be utilized so as to properly electrically engage with a plurality of harness connector receptacles with polygonal terminal placement patterns found on the first vehicle. Accordingly, Terminals 12 and 17 placed among aperture pattern 9 are spaced and configured to mate with a 6-way round trailer harness receptacle on first vehicle, pattern 14 mateable with a 4-way round receptacle, pattern 16 with a seven way round "Pin Style" receptacle, and pattern 18 mateable with a five way round receptacle. Polygonal patterns including eight or more terminals are also intended to fall within the scope of the current invention.

FIGS. 1B, 5 and 6 illustrates a second embodiment of adapter 10' having terminal housing frontal portion 15' sized and adapted to engage with 7-way round "Blade Style", trailer harness receptacle of the first vehicle. Terminal frontal portion 15' having at least one spade or blade style electrical terminal 30 and 32, each positioned in a particular polygonal pattern which will provide electrical transmission or continuity with a blade style trailer wiring harness receptacle on a vehicle. Said terminals 30 and 32 are preferably within a recessed preferably rectangular first and second aperture 34 and 36 respectively, extending within the housing 11 therein. Terminal housing frontal portion 15' may also, or instead of terminal 32, have a single round or barrel shaped male terminal 38 placed substantially in the center of a substantially round polygonal third aperture 40 extending along centerline within the housing 11 therein.

FIG. 1C illustrates a third embodiment of adapter 10" having terminal housing frontal portion 15" sized and adapted to engage with a four way flat style trailer harness connector of the first vehicle, having a round or barrel shaped female electrical terminal 50 and as many as three round barrel shaped male terminals 51, 52, and 53, all terminals being in a spaced offset linear alignment to each other.

As shown in FIGS. 1A, 1B, 1C, 2, 3, 4, 5, and 6 adapter 10, 10', 10" and 10'" at second end 4, being appropriately spaced from first end 2, to allow an appliance connector portion 7 with at least one round cigarette lighter plug receptacle aperture 60 extending substantially within housing 11 therein. Positioned preferably center within second end round aperture 60 is a round barrel shaped female electrical contact receptacle terminal 62 with an electrical contact terminal 64, positioned center within receptacle 62, forming two insulation displaced electrical connector terminals 64 and 62 respectively. Said surfaces 62 and 64 provides electrical continuity to cigarette plug contact surfaces 27 and 23 when cigarette lighter plug 22 is properly inserted into plug receptacle aperture 60. [Contact surface 62 having any shape sufficient for proper electrical continuity when engaged with contact terminal 23 equipped on cigarette lighter receptacle plugs 22.] Insulation displaced electrical conductors such as wires 21 and 25 and/or printed circuit board 26 extend preferably within said housing 11, between first end 2 and second end 4, providing electrical continuity between terminals 17 and 64 and terminals 12 and 62 respectively. Thus, the novel Power Adapter Interface Apparatus provides electrical adaptation from a plurality of styles of trailer harness receptacles located on a first vehicle to power a variety of appliances equipped with a cigarette lighter plug.

Appliance connector rearward portion 7 may in addition to, or instead of, have at least one 110 volt AC style plug receptacle 66 portion having a least two slotted rectangular apertures spaced and parallel to each other 68 and 70 extending within housing therein 11 containing a seventh and eighth electrical AC style terminal connectors 72 and 74 respectively (not shown). Receptacle 66 may also include a third aperture 76 also extending within housing 11 which may also contain an additional AC terminal connector 78, (not shown).

Adapter embodiment including an 110 volt AC style plug receptacle 66 will include a 12–13.8 DC volt to 110 volt AC power converter circuit, well known in the art, upon said printed circuit board extending within adapter housing 11 preferably placed between first and second ends 2 and 4. In addition, adapter housings length between ends 2 and 4 may be extended to include a flexible cord containing at least two insulation displaced electrical conductors or wires within, (not shown), thus extending the usable distance of the adapter 10, 10', 10", and 10'", between the first vehicle and the desired appliance.

FIG. 2 is a third embodiment of adapter 10, 10', 10", and 10'" which includes housing 11, having a third end 89 and fourth end 85, positioned preferably substantially perpendicular from ends 2 and 4, and away from each other. Ends 89 and 85 forming preferably round male terminal connector posts 80 and 82 sufficient in size and diameter for gripping surfaces, 83 and 84 respectively, required for clamping ability of a battery jumper cable clamp and cord extending from a second vehicle (not shown). At least one of male terminals 80 and 82 may also include a removable protective cap 86 attached there also to housing 11 via flexible cord 87 having sufficient allowing length for removal and insertion of said cap around each said terminal.

In addition, adapter 10, 10', 10", 10'", for proper operational confirmation, provides at least one visual illuminating diagnostic indicator 88, such as an LED or light bulb, may be interconnected with said insulation displaced electrical conductors, wires, or printed circuit board located within housing 11. The indicator 88 having a portion of which exposed, protruding or recessed in said housing allowing visual observance by the user.

It will be obvious to those skilled in the art that many variations and modifications may be made to the above described embodiments, which were chosen for the purpose of illustrating the present invention, without substantially departing from the spirit and scope of the present invention. Accordingly, all such variations and modifications are intended to be included herein within the scope of the following claims.

Wherefore, the inventor claims the following:

1. A power adapter body comprising a housing having a substantially round first end spaced from a second end, said first end having a first and a second round female electrical terminal extending within two of at least three apertures extending into said first end of said housing, said first and second terminals within said first end are spaced and configured to engage with at least two terminals housed within a trailer harness receptacle on a motor vehicle, appliance connector portion forming at least one a cigarette lighter plug receptacle aperture extending substantially within said second end of said housing, said receptacle aperture having a barrel shaped third female electrical terminal with a fourth electrical terminal positioned substantially centrally within said third terminal, said first and second terminals being electrically connected to said third and fourth electrical terminals respectively via at least two electrical conductors extending within said housing.

2. The power adapter body of claim 1, wherein said first end is configured having a keyed cylindrical housing.

3. The power adapter body of claim 1, wherein said electrical conductors are wires.

4. The power adapter of claim 1, wherein said electrical conductors are on a printed circuit board extending within said housing therein.

5. The power adapter body of claim 1, wherein said insulation displaced electrical conductors are part of a flexible cord extending between first and and said second end.

* * * * *